United States Patent [19]

Weber

[11] Patent Number: 4,490,495

[45] Date of Patent: Dec. 25, 1984

[54] COMPOSITION AND METHOD FOR TINTING PLASTIC

[75] Inventor: Hermann Weber, Tarzana, Calif.

[73] Assignee: Techsight Corp., Southbridge, Mass.

[21] Appl. No.: 441,484

[22] Filed: Nov. 15, 1982

[51] Int. Cl.$^3$ .................. C08L 61/28; C08K 5/54; B29D 11/00

[52] U.S. Cl. .................. 524/264; 524/265; 524/542; 524/598; 428/412; 8/506; 8/507

[58] Field of Search ........... 524/857, 542, 264, 265, 524/598; 106/287.16

[56] References Cited

U.S. PATENT DOCUMENTS

| | | | |
|---|---|---|---|
| 2,643,984 | 6/1950 | Boyd | 524/542 |
| 3,817,905 | 6/1974 | Lerner | 524/857 |
| 3,862,261 | 1/1975 | Stoddard | 524/542 |
| 3,868,343 | 2/1975 | Stengle | 524/598 |
| 4,173,490 | 11/1979 | Rotenberg | 106/287.14 |
| 4,223,065 | 9/1980 | Amemiya | 524/542 |
| 4,275,118 | 6/1981 | Baney | 427/387 |
| 4,338,375 | 7/1982 | Hashimoto | 106/287.16 |
| 4,394,177 | 7/1983 | Fujioka | 106/287.16 |

*Primary Examiner*—C. Warren Ivy
*Attorney, Agent, or Firm*—Blakely, Sokoloff, Taylor & Zafman

[57] ABSTRACT

A solution for coating plastic material for tinting and the method of making said solution is described. The process for coating plastic material and for tinting the material is also described. This solution and process provides scratch resistance to the surface of the coated polycarbonate and CR-39 lenses, absorbs dye and permits the plastics to absorb the dye and adheres strongly to the plastic surface.

11 Claims, No Drawings

COMPOSITION AND METHOD FOR TINTING PLASTIC

BACKGROUND OF THE INVENTION

This invention relates to a solution for coating plastic material such that it can be tinted and the process for tinting plastic material and more specifically, for tinting polycarbonate and other plastic eyeglass lenses.

Presently eyeglass lenses are made from either glass or plastic. Plastic lenses have advantages over glass in that they are lighter and can be easily tinted by an optical laboratory using procedures well known in the art. The major drawback to most currently used tintable plastic lenses is that they are easily scratched and broken upon impact.

Polycarbonate is a synthetic thermoplastic resin with characteristics which make it a better material for use in eyeglass lenses than glass and allyl diglycol carbonate (CR-39 made by PPG, Pittsburgh, PA), the leading plastic used for plastic lenses today. Polycarbonate is lighter than glass and CR-39, making optical lenses made from this material more comfortable in that there is less strain due to the weight of the lenses on a wearer's nose and ears. Polycarbonate is also less expensive to manufacture than glass and CR-39 and has a higher refractive index and substantially the same light transmittance as glass. Both polycarbonate and CR-39 lense are generally coated with a material that imparts a scratch resistance to these plastics such as silica-silanol. Most significantly, coated polycarbonate has equal or greater scratch resistance than CR-39 and significantly greater impact resistance. The one drawback to coated polycarbonate is the inability of dye to penetrate coatings applied to polycarbonate lenses to tint them.

The lens manufacturer generally produces semifinished CR-39 plastic lens blanks with the convex surface cut, ground and polished. The lens is also coated with a hard scratch resistant coating that inhibits absorption of the tinting dye through that surface. An optical laboratory receiving the semifinished lens, cuts, grinds and polishes the concave surface of the lens to a specific prescription thereby grinding the coating off and then tints it to a customer's specifications. The uncoated surface of the CR-39 lens absorbs the dye during the tinting process. The lens is then edged to fit the eyeglass frame. Polycarbonate finished lenses, on the other hand, are generally produced in a single molding step for a preselected prescription by the manufacturer, thereby making grinding and polishing steps unnecessary, and are then coated with a scratch resistant coating. The optical laboratories, in general, do not have the tools to cut and grind to a specified prescription lenses made of polycarbonate. Polycarbonate lenses, because of the presence of the coating, cannot be tinted by the standard techniques used in the industry.

Uncoated polycarbonate material may be tinted with dyes typically used for tinting plastic lenses if the tinting solution is heated to 190° to 195° F. However, uncoated polycarbonate lenses are not generally distributed by the manufacturers because of the poor scratch resistant qualities of the uncoated material. The present procedure for tinting uncoated polycarbonate lenses is by vacuum deposition.

Under current methodology, CR-39 plastic lenses are tinted by the following procedure. After finishing, the lenses are dipped in a dye solution and slowly removed. The duration the lens is submerged in the dye solution determines the degree to which the lens is tinted. In a last step which is performed by some optical laboratories, the lens is coated providing greater scratch resistance. Most of the optical laboratories are set up to perform the above-described tinting procedure.

The present invention teaches a composition and method useful in preparing polycarbonate such that it can be tinted using similar techniques and the same equipment and dyes as those currently being used in the industry for CR-39 lenses.

SUMMARY OF THE INVENTION

A solution and method of preparing said solution for coating transparent plastic material so that it can be tinted is described herein. The process of tinting polycarbonate material using said solution is also described.

The solution and process may be used to coat plastics such as polycarbonate and CR-39, among others. The plastics may be in any form, for example, optical lenses, windows, windshields, motorcycle farings and visors. The invented coating is permeable to dyes typically used for tinting plastic eyeglass lenses and permits the coated material to absorb the dye also. The coating hardens to make the coated material abrasion resistant. In addition, it strongly adheres to the surface of the plastic, in particular, polycarbonate and CR-39. The solution provides a smooth and uniform coating on the surface of a polycarbonate lens which dries without forming any pockets. The composition and method for producing the solution are described in greater detail below.

After the lens is coated, it may be tinted using the similar types of dyes and procedures as are currently in use in the industry. Therefore, the present invention has advantages over the prior art in that the optical laboratories' personnel do not have to be retrained, or the laboratories re-equipped or restocked to perform the techniques described herein.

It is anticipated that a polycarbonate lens manufacturer would produce the polycarbonate lens and prepare it for tinting by coating it with the solution disclosed herein. An optical laboratory would then tint the lens according to customer specifications as is commonly done in the industry. However, a manufacturer could of course provide tinted lenses using the invented composition and method.

DETAILED DESCRIPTION OF THE INVENTION

The order of the steps as proposed herein is not of critical importance except where a precursor solution or mixture is necessary for a subsequent step. The steps as described hereinbelow are ordered simply for convenient reference.

In the first step of the preferred embodiment, glycidoxypropyltrimethoxysilane (Z-6040, made by Dow Corning of Midland, Mich.) is mixed with n-butanol in a ratio within a range of 1:3 to 3:1. The preferred concentration is 3 parts Z-6040 to 1 part n-butanol. In place of n-butanol, 2-butoxyethanol may be used and vinyltrimethylsilane may be used in place of the Z-6040. This mixture or other possible combinations which hold the water in the final mixture separate from the titanate component therein, thereby increase the shelf life. The n-butanol component can be used by itself without Z-6040 or a substitute in the coating solution but hydrolysis occurs and the solution becomes ineffective after a few hours.

In the second step, 100 ml of the mixture of step one is added to 40 ml of deionized distilled water. The water in the preferred embodiment has a resistivity of about 50-20 kilo ohms and contains approximately 125 to 160 parts per million of dissolved solids. While it is not necessary for the water to be so purified, some purification of tap water is necessary to avoid precipitation of dissolved solids from the tap water in the final solution.

In the next step, 30 ml of tetraisopropyl titanate, 40 ml of methanol, and 5 ml of 37% sulfuric acid are mixed together with a magnetic stirrer until the mixture is a single phase and clear. Tetrabutyl titanate or other alkyl titanates may be used instead of the tetraisopropyl titanate. Hydrochloric acid or other strong inorganic acids such as nitric acid may be used in place of the sulfuric acid in this reaction. It is critical in this step that the tetraisopropyl titanate is not mixed with water, which would cause the solution to gel thereby prohibiting the desired mixing. The compositions of step 1 and step 2 are then mixed together.

In the preferred embodiment, alcohols with different vapor points, in this instance n-butanol and methanol, are used in the solution. The combination of said alcohols permit even drying of the coating on the surface of the polycarbonate material to proceed without the formation of pockets in the coating.

In the next step 13 ml of hexamethoxymethylmelamine (Cymel 303 made by American Cyanamid Company, Wayne, N.J.) and 13 ml of melamine formaldehyde resin (27-806 Uformite F3T40 made by Reichhold Chem. Co., White Plains, N.Y.) are mixed together. Cymel 303 is a clear viscous liquid typically having 98% NON-volatiles, 0.01% ASH MAXIMUM, a Gardner viscosity of X-Z2 at 25° C. and an equivalent weight of 130-140. This melamine resin mixture must be constantly mixed for 15 hours to avoid settling. Other urea formaldehyde resins will also work to adhere to the polycarbonate surface and absorb the dye.

The mixture of the fourth step is then mixed with the melamine resin mixture of the fifth step. In the final step, 0.2 ml of silicone glycol (Paint Additive Number 57, made by Dow Corning of Midland, Mich.) is added to the combination of the sixth step. The silicone glycol Paint Additive Number 57 is a siloxane which typically is a light colored liquid having a specific gravity at 77° F. of 1.022, and a viscosity at 77° F. of 300 cps. The flash point in a closed cup is 210° F. (90° C.) This surfactant is water dispersable and soluble in many organic solvents such as acetone, methylene chloride, toluene, naphtha, mineral spirits, and isopropanol. Other fluorocarbon surfactants can be used in place of the silicone glycol to reduce surface tension and increase the wetness of the coating solution to allow even flow over the surface to be coated. The pH of the final solution is the range of 4.0 to 6.5.

Table I summarizes the ingredients and their final concentrations of the preferred embodiment and the range of concentrations of said ingredients.

TABLE I

| Chemical | Preferred Concentration (By Volume) | Concentration Range (By Volume) |
| --- | --- | --- |
| Water | 16.5% | 14.5-18.5% |
| N—Butanol | 41.5% | 31.5-51.5% |
| Tetraisopropyl Titanate | 12.5% | 7.5-17.5% |
| Methanol | 16.5% | 11.5-21.5% |
| 37% Sulfuric Acid | 2.0% | 1.7-2.3% |
| Hexamethoxymethyl-melamine | 5.5% | 3-9% |
| Melamine Formaldehyde Resin Solution | 5.5% | 3-9% |
| Silicone Glycol | 0.083%* | 0.025-0.083% |
| TOTAL | 100% | |

*Not included in Total.

The solution should then be stored in a cool location, preferably at 10° C. with a range of 4° C. to 25° C. Cool storage will increase the shelf life of the coating solution.

A polycarbonate lens may be tinted by the following process. The lens is dipped in the coating solution, the composition of which is described hereinabove, and pulled from said solution at a rate of approximately 6 inches per minute. The lens may otherwise be sprayed, or subjected to flow or spin coating techniques to apply said solution so long as the coating is substantially smooth and evenly disbursed. The coating on the lens should be in the range of 2 microns to 11 microns with the preferred thickness of coating approximately 4 to 6 microns. In the preferred embodiment, the dipped lens is then pre-cured in a dust-free storage area for a period of at least 30 minutes up to one hour. This pre-curing step is optional.

Many types of transparent plastics such as polycarbonate, CR-39, styrene and polypropylene can be tinted using the above-described coating solution. If CR-39 is to be tinted, the material must first be cleaned and etched by soaking it in a strong alkaline solution such as 20% sodium hydroxide until it is degreased. Other plastics, such as polycarbonate may be coated without this degreasing step.

The lens is then cured in an oven at a temperature of 110° C. to 135° C. for 7 to 16 hours. In the preferred embodiment the lens is cured at 125° C. to 130° C. for a period of 14 hours. As an optional step after curing, the lens may be soaked in a degreasing and surface conditioning prep solution such as Lens Prep II made by B.P.I. (South Miami, Fla.) diluted 1:10 with distilled water. Finally the lens is dipped in a tinting solution such as a commercially available fabric dye, or lens dye such as Rit liquid dye made by CPC International, Inc. (Indianapolis, Ind.). Dyes found to be most effective come from the family of dyes belonging to the azo and diazo compounds, such as diazoaminobenzene, paradiazobenzene sulfonic acid and 1-diazo-2-napthol-4-sulfonic acid.

If the dying step is performed at about 150° F., the dye is absorbed by the coating only. At about 190° F. to 200° F., the dye will penetrate the polycarbonate and give said polycarbonate additional tinting capacity such that darker tints as with sunglasses are produced.

It is anticipated that other formulations and derivations of the invention described herein may be utilized without departing from the scope of the present invention. The present invention is to be limited only by its claims and not by any indications in the specifications denoting the preferred composition and method.

Therefore, we claim:

1. A solution for coating plastic material for tinting comprising by volume, all percentages based upon the final concentrations:
   (a) a first mixture of:
      (1) 14.5% to 18.5% water reasonably free of dissolved solids whereby there is minimal precipitation of said solids upon addition of the other components, and
      (2) 31.5% to 51.5% of a component selected from the group consisting of n-butanol, 2-butoxyethanol, and a mixture in the range of 3:1 to 1:3 by volume of:
         (i) an alcohol selected from the group consisting of n-butanol and 2-butoxyethanol, and
         (ii) a silane compound selected from the group consisting of glycidoxypropyltrimethoxysilane and vinyltrimethylsilane
   (b) a second mixture of:
      (1) 7.5% to 17.5% alkyl titanate;
      (2) 11.5% to 21.5% methanol;
      (3) 1.7% to 2.3% of strong inorganic acid;
   (c) a third mixture of:
      (1) 3% to 9% hexamethoxymethylmelamine; and
      (2) 3% to 9% synthetic resin comprising urea-formaldehyde and melamine formaldehyde condensates; and
   (d) 25 to 83 parts per million surfactant.

2. The solution of claim 1 wherein
   said water is distilled deionized water,
   said alkyl titanate is selected from the group consisting of tetraisopropyl titanate and tetrabutyl titanate,
   said strong inorganic acid is selected from the group consisting of sulfuric acid, hydrochloric acid and nitric acid, and
   said surfactant is selected from the group consisting of silicone glycol and fluorocarbon surfactants.

3. The solution of claim 1 wherein said alcohol-silane mixture is a 3 to 1 mixture by volume of glycidoxypropyltrimethoxysilane and n-butanol.

4. The solution of claim 1 wherein said alkyl titanate is tetraisopropyl titanate,
   said strong inorganic acid is sulfuric acid, and
   said surfactant is silicone glycol.

5. A solution for coating polycarbonate material for tinting comprising by volume, all percentages based upon the final concentrations:
   (a) a first mixture of:
      (1) 10% n-butanol, and
      (2) 31.5% glycidoxypropyltrimethylsilane,
      (3) 16.5% distilled deionized water,
   (b) a second mixture of:
      (1) 12.5% tetraisopropyltitanate,
      (2) 16.5% methanol, and
      (3) 2.0% sulfuric acid,
   (c) a third mixture of:
      (1) 5.5% hexamethoxymethyl melamine, and
      (2) 5.5% synthetic resin composition comprising urea formaldehyde, and melamine formaldehyde condensates, and
   (d) 82 parts per million silicone glycol.

6. The method of making a solution for coating plastic material for tinting comprising the steps of:
   (1) mixing in a ratio of from 1:3 to 3:1 by volume an alcohol selected from the group n-butanol and 2-butoxyethanol and silane selected from the group consisting of glycidoxypropyltrimethoxysilane and vinyltrimethylsilane,
   (2) mixing together 31.5% to 51.5% of the mixture of the first step with 14.5% to 18.5% water;
   (3) mixing together 11.5% to 16.5% methanol, 1.7% to 2.3% of a strong acid and 7.5% to 17.5% alkyl titanate;
   (4) mixing together the mixtures of the second and third steps;
   (5) mixing together 3% to 9% hexamethoxymethylmelamine and 3% to 9% melamine formaldehyde resin solution;
   (6) mixing together the mixtures of the fourth and fifth steps; and
   (7) adding silicone glycol making a final concentration in the range of 25 to 83 parts per million, all percentages by volume based on the final concentration.

7. The method of claim 6 wherein said water is distilled deionized water,
   said alkyl titanate is selected from the group consisting of tetraisopropyl titanate and tetrabutyl titanate,
   said strong inorganic acid is selected from the group consisting of sulfuric acid, hydrochloric acid and nitric acid, and
   said surfactant is selected from the group comprising silicone glycol and fluorocarbon surfactants.

8. The solution of claim 6 wherein said mixture of two components is a 3 to 1 mixture of glycidoxypropyltrimethoxysilane and n-butanol.

9. The solution of claim 6 wherein said alkyl titanate is tetraisopropyl titanate,
   said strong inorganic acid is sulfuric acid, and
   said surfactant is silicone glycol.

10. The method of claim 6 wherein the third step further comprises mixing tetraisopropyl titanate, methanol and sulfuric acid with a magnetic stirrer until said mixture is a single phase and clear.

11. The method of making a solution for coating plastic material comprising the steps of:
   (1) mixing together n-butanol and glycidoxypropyltrimethoxysilane in a ratio of about 1:3,
   (2) mixing together the mixture of the first step with distilled deionized water in a a ratio of about 2.5:1,
   (3) mixing together tetraisopropyl titanate, methanol and 37% sulfuric acid in a ratio of about 6:8:1 with a stirring instrument whereby said mixture is a single phase and clear,
   (4) mixing together the mixture of the second step with the mixture of the third step in a ratio of about 2:1,
   (5) mixing together hexamethoxymethymelamine and melamine formaldehyde resin solution in a ratio of about 1:1,
   (6) mixing together the mixture of the fourth step with the mixture of resins from the fifth step in a ratio of about 8:1,
   (7) adding silicone glycol to the mixture of the prior step, said siloxane having a final concentration in the mixture of 0.082%, all ratios and percentages based on volume.

* * * * *